Patented Oct. 30, 1951

2,572,884

UNITED STATES PATENT OFFICE 2,572,884

REDISPERSING AND COMPOUNDING RUBBER

Arthur Pollak, New York, and John J. Keilen, Jr., Forest Hills, N. Y., assignors to West Virginia Pulp and Paper Company, New York, N. Y., a corporation of Delaware No Drawing. Application February 26, 1948, Serial No. 11,313

28 Claims. (Cl. 260—17.5)

Our invention relates to improvements in rubber compounding.

In the usual method of rubber compounding the rubber is first coagulated from its state of suspension in the original latex. The crude rubber, whether natural or artificial, is then masticated in a suitable type of mill, following which plasticizers and softeners are added. Then at the appropriate time the fillers, other chemicals, such as accelerators, anti-oxidants and vulcanizing agents are added, the milling being continued to disperse the compounding ingredients in the rubber. Alternatively it has been proposed to add a suspension of reinforcing agent or pigment, as for example carbon black, to the latex and to precipitate the rubber and pigment together, after which the other ingredients are added by milling. Because the milling operation requires considerable hand labor and power, much effort has been expended in the attempt to devise some other method of incorporating compounding agents in rubber. Thus many attempts have been made to utilize the product obtained by spray drying ordinary rubber latex either as such or with added chemicals. Such processes while offering promise have fallen short of complete success mainly for the reason that it has heretofore not been practicable to separate from the rubber the other solids naturally occurring in the latex. In natural latex such other solids consist largely of protein material whereas in the case of artificial rubbers a considerable quantity of soap is present.

In accordance with our invention rubber from either natural or artificial latices may be precipitated, the precipitates collected and washed free of impurities without causing the rubber particles to coalesce. In this state the rubber particles of the precipitate or filter cake may be reconverted to the original dispersion minus the impurities. Such dispersion may be mixed with the appropriate compounding agents and the entire mixture dried and the dried product molded and vulcanized with little or no milling operation.

Our invention is predicated upon our discovery that rubber can be coprecipitated with an agent which surrounds the rubber particles and keeps them separated from each other so that they can be easily redispersed. The best substance we have found to date having this property is lignin. Since lignin acts as a reinforcing agent for the rubber and is compatible with carbon black and other reinforcing pigments its presence, far from being objectionable, is beneficial. (See Journal of Industrial and Engineering Chemistry, vol. 39, pp. 480–483, April 1947.)

Our invention will be further illustrated by the following illustrative example:

A coprecipitate of lignin and rubber containing 50 lbs. of lignin per 100 lbs. of GR–S (butadiene, styrene copolymer) was obtained in the following manner:

A solution of lignin was first made by preparing a slurry of 25 lbs. thereof in 65 lbs. of water and then adding 10 lbs. of 50% caustic soda. The resulting 100 lbs. of solution contained 25% lignin in the form of sodium lignate.

20 lbs. of GR–S latex containing anti-oxidants and short stop agents having a rubber content of 5 lbs. was then mixed with 10 lbs. of the 25% lignin solution. An 0.8% sulfuric acid solution was prepared by adding 1.8 lbs. of 60° Bé. (77.7%) sulfuric acid to 178 lbs. of water. This solution was heated to 194° F. and the lignin-latex mixture slowly added thereto while agitating thoroughly. The mixture was then filtered and washed. After washing, the coprecipitate was removed from the filter and placed in a mixer of the bowl and whip type. The usual compounding chemicals were then added as dry powders except for the plasticizer BRT (coal tar oil product) which is a tarry fluid. This was added as a liquid. A total mixing time of 45 minutes was used to insure adequate dispersion of the chemicals and admixture with the dispersed rubber particles. The mixture of coprecipitate and chemicals was put into shallow pans and dried for 48 hours at 70° C. Following are the proportions of chemicals used, parts by weight:

| | |
|---|---|
| Lignin GR–S–50 | 150 |
| Zinc oxide | 5 |
| Altax | 1.5 |
| Cumate | 0.3 |
| BRT #4 | 8 |
| Sulfur | 2.5 |

The dried mixture was sheeted out on the roll mixer which required 5 minutes' time. It was then cured and tested with results as follows:

| Property | Cure 30 | Min. 45 | At 292° F. 60 |
|---|---|---|---|
| 300% modulus, p. s. i. | 900 | 1,010 | 910 |
| Tensile Strength, p. s. i. | 1,850 | 2,080 | 2,010 |
| Elongation at break, per cent | 560 | 570 | 570 |
| Shore "A" hardness | 82 | 84 | 84 |
| Tear resistance, lbs./in. | 250 | 240 | 240 |

The time for mixing was greater than necessary and could be reduced considerably. However, even without this reduction the power saving is very considerable. A half horse power motor was used on the mixer whereas the same mixing operation performed on dried coprecipitates would require at least 45 minutes using about 5 horse power. In another experiment a slight quantity of water was used to redisperse the filter cake.

The redispersed coprecipitates mixed with curing chemicals may if desired be sprayed on any suitable surface as a coating or such mixture may be applied to a textile, paper or other surface with either a knife or roll coating device similar to those used for applying pigments to paper, after which the composite article is subjected to a curing operation. The proportion of lignin may be varied widely depending upon how much lignin is desired in the final product. As little as from 6 to 9% lignin based on the rubber is sufficient to make the rubber particles redispersible.

A GR-S, carbon black lignin coprecipitate containing 100 lbs. GR-S, 5 lbs. lignin and 45 lbs. carbon black was prepared in the following manner:

A solution of lignin was first made by preparing a slurry of 2.5 lbs. thereof in 74 lbs. of water and then adding 1 lb. of 50% caustic soda. In this lignin solution was dispersed 22.5 lbs. of carbon black. The resulting 100 lbs. of mixture contained 2.5% lignin in the form of sodium lignate and 22.5% carbon black.

20 lbs. of GR-S latex having a rubber content of 5 lbs. was then mixed with 10 lbs. of the mixture containing 2.5% lignin and 22.5% carbon black. An 0.18% sulfuric acid solution was prepared by adding 0.34 lb. of 60° Bé (77.7%) sulfuric acid to 145 lbs. of water. This solution was heated to 194° F. and the lignin-latex mixture slowly added thereto while agitating thoroughly. The mixture was then filtered and washed.

After washing, the coprecipitate of this composition was removed from the filter and was redispersed in the manner of the preceding example, mixed with the usual compounding agents and dried at 70° C. for 24 hours, then milled, molded and cured.

While our invention involving the redispersion of the lignin containing coagulated latex rubber has been illustrated using a latex of GR-S, it will be apparent that latices of other rubbers, i. e., natural or other artificial rubbers such as the copolymer of butadiene and acrylonitrile (GR-A), the polymer of chlorobutadiene (GR-M) etc. are equally applicable.

The redispersed mixture of rubber particles, lignin, additional reinforcing agents if present and curing and compounding agents may, if desired, be spray dried and the dried material filled into molds and cured. The spray drying will preferably be conducted on the mixture which has been rendered sufficiently fluid by agitation and under conditions such that the temperature of the mixture will preferably not exceed 350° F.

A sample prepared as per the foregoing example involving the redispersion of GR-S, carbon black and lignin in the proportions respectively of 100:45:5 together with compounding ingredients tested as follows:

| Property | Cure 30 | Min. 45 | At 292° F. 60 |
|---|---|---|---|
| 300% modulus, p. s. i. | 450 | 980 | 1,130 |
| Tensile strength, p. s. i. | 2,950 | 2,920 | 2,690 |
| Elongation at break, per cent | 610 | 590 | 520 |
| Shore "A" hardness | 70 | 71 | 70 |
| Tear resistance, lbs./in. | 186 | 206 | 172 |

The action above called for of milling the dried mixture of redispersed rubber and compounding materials to form a sheet, preliminary to curing, results in most instances in an increase in strength.

Lignin is generally identified as that component of wood which is insoluble in 72% $H_2SO_4$; it is a compound of carbon, hydrogen, and oxygen, and sometimes of the foregoing plus sulfur, and is further characterized by being soluble in solvents such as dioxane and by having sufficient acidity so that it will combine with sodium or nitrogen alkalis, and form water soluble compounds which can be precipitated by adding acids. In sulfite cooking the lignin of the wood is rendered soluble by the action of the wood with cooking liquors. These extracts of the wood either as such or partly purified are sometimes mistakenly termed "lignin" but are actually lignin sulfonates. It is possible to treat lignin sulfonates with alkali to convert them to a form which is insoluble in water but soluble in alkaline solution the same as sulfate or soda lignin. When so treated, such sulfite lignin would come within the purview of our invention.

The lignin used in the foregoing examples was obtained by first concentrating the black liquor from the sulfate cooking of pine wood, removing tall oil skimmings, lowering the pH of the liquor by treatment with carbon dioxide gas, and coagulating the lignin by heat and purifying by acid washing. The lignin so made is a dry powder having the following range of analysis:

Per cent
Moisture _____ 4
Ash _____Less than 0.5
Sulfur _____ 1-2
Methoxyl _____ 13.5-14.5
Dioxane insolubles _____Less than 1

A still further source of lignin suitable for the purpose of the present application is the saccharification of the wood and other ligneous vegetable matter, e. g., the Scholler process and its modifications, which produces an insoluble ligneous residue which is highly acidic, containing some sugars, hemicelluloses and other degradation products of cellulose. This material is susceptible to purification to yield a material suitable for coprecipitation with rubber.

We claim:

1. In the manufacture of shaped and cured rubber articles the steps of preparing a mixture of a latex of a rubbery butadiene 1,3 polymer and a reinforcing agent including lignin, acid precipitating said mixture and obtaining a coprecipitate of said polymer and reinforcing agent in which said polymer is in the form of wet substantially non-coalescent particles, separating same from the attendant solution to yield a wet mass which is substantially free from acid and water soluble material and in which said polymer particles are still substantially non-coalescent, dispersing rubber compounding agents in said mass to yield an aqueous dispersion containing the polymer, reinforcing agent and rubber compounding agents, and drying the dispersion so formed.

2. The method of compounding a rubbery butadiene 1,3 polymer which comprises mixing a latex containing said polymer with an alkaline solution of lignin, acid precipitating the mixture and obtaining a polymer lignin coprecipitate in the form of wet non-coalescent particles, separating the same from the attendant solution to yield a wet mass substantially free from acid and water soluble material and in which the polymer particles are still substantially non-coalescent, dispersing rubber compounding agents therein to yield an aqueous dispersion containing the polymer, lignin, and rubber compounding agents and drying the dispersion so formed.

3. The method of compounding a rubbery butadiene 1,3 polymer which comprises mixing a latex containing said polymer with an alkaline solution of lignin, acid precipitating the mixture and obtaining a polymer lignin coprecipitate in the form of wet non-coalescent particles, separating the same from the attendant solution to yield a wet mass substantially free from acid and water soluble material and in which the polymer particles are still substantially non-coalescent, dispersing rubber compounding agents therein to yield an aqueous dispersion containing the polymer, lignin, and rubber compounding agents and spray drying the dispersion so formed to yield a divided material ready for forming and curing.

4. The method of compounding a rubbery butadiene 1,3 polymer which comprises mixing a latex containing said polymer with an alkaline solution of lignin and incorporating in the mixture a reinforcing agent; acid precipitating the mixture and obtaining a coprecipitate in the form of wet substantially non-coalescent particles containing the polymer, lignin and reinforcing agent; separating the aqueous dispersion from the attendant solution to yield a wet mass substantially free from acid and water soluble material and in which the polymer particles are still substantially non-coalescent; dispersing rubber compounding agents therein and drying the dispersion so formed.

5. The method according to claim 4 in which the reinforcing agent is carbon black.

6. The method according to claim 1 in which the latex is that of butadiene-styrene copolymer.

7. The method according to claim 2 in which the latex is that of butadiene-styrene copolymer.

8. The method according to claim 3 in which the latex is that of butadiene-styrene copolymer.

9. The method according to claim 1 including the step of milling the dried product containing uncured dispersed rubber particles for a time necessary to form a sheet.

10. The method according to claim 2 including the step of milling the dried product containing uncured dispersed rubber particles for a time necessary to form a sheet.

11. The method according to claim 1 in which the lignin present is at least 6% based on the rubber.

12. The method according to claim 4 in which the latex is that of butadiene styrene copolymer.

13. The method according to claim 1 in which the latex is that of natural rubber.

14. The method according to claim 2 in which the latex is that of natural rubber.

15. The method according to claim 3 in which the latex is that of natural rubber.

16. The method according to claim 4 in which the latex is that of natural rubber.

17. The method according to claim 1 in which the latex is that of the copolymer of butadiene and acrylonitrile.

18. The method according to claim 2 in which the latex is that of the copolymer of butadiene and acrylonitrile.

19. The method according to claim 3 in which the latex is that of the copolymer of butadiene and acrylonitrile.

20. The method according to claim 4 in which the latex is that of the copolymer of butadiene and acrylonitrile.

21. The method according to claim 1 in which the latex is that of the polymer of chlorobutadiene.

22. The method according to claim 2 in which the latex is that of the polymer of chlorobutadiene.

23. The method according to claim 3 in which the latex is that of the polymer of chlorobutadiene.

24. The method according to claim 4 in which the latex is that of the polymer of chlorobutadiene.

25. A product made by the process of claim 3.

26. A product made by the process of claim 3 in which the polymer is butadiene-styrene.

27. A product made by the process of claim 3 in which the polymer is butadiene-acrylonitrile.

28. A product made by the process of claim 3 in which the polymer is chlorobutadiene.

ARTHUR POLLAK.
JOHN J. KEILEN, Jr.

REFERENCES CITED

The following references are of record in the file of this patent:

UNITED STATES PATENTS

| Number | Name | Date |
|---|---|---|
| 1,567,506 | Hopkinson | Dec. 29, 1925 |
| 2,053,530 | Noble | Sept. 8, 1936 |
| 2,082,304 | Stam | June 1, 1937 |
| 2,115,154 | Alton | Apr. 26, 1938 |
| 2,195,380 | Patrick | Mar. 26, 1940 |
| 2,289,672 | Merrill | July 14, 1942 |
| 2,355,180 | Remy | Aug. 8, 1944 |

OTHER REFERENCES

"Indulin for Reinforcing Rubber"; by the Industrial Chemical Sales Division of West Virginia Pulp and Paper Co., copyrighted on August 30, 1946 (30 pages).